Nov. 25, 1930.   J. A. MacKENZIE   1,782,735
FLUID TREATING APPARATUS
Filed March 21, 1927
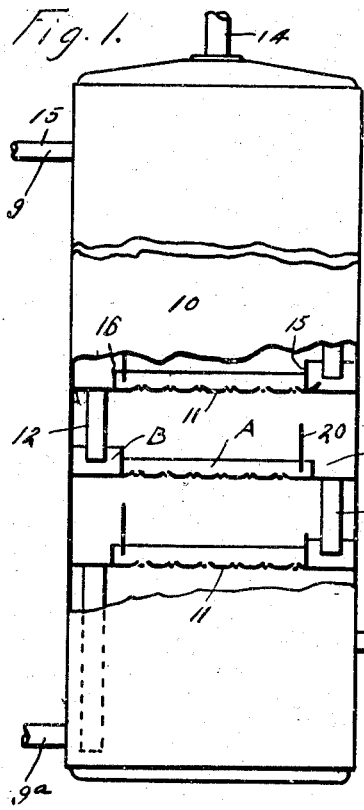
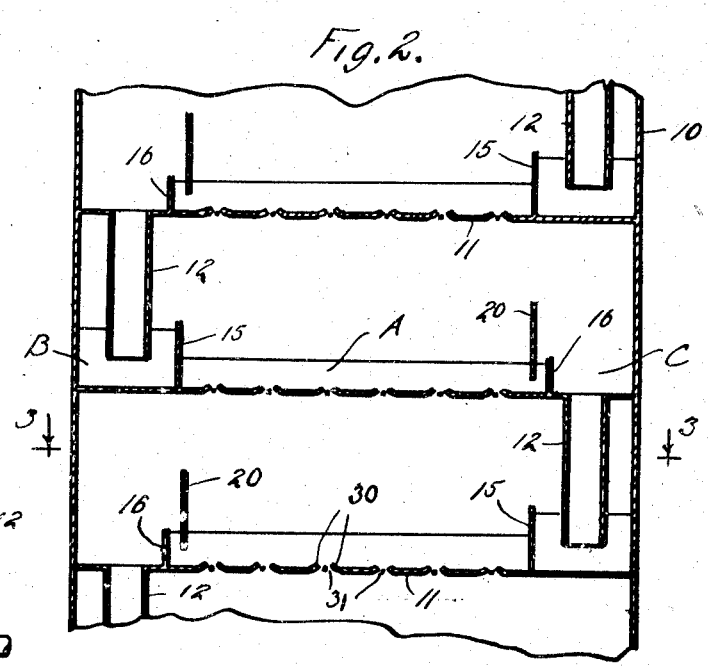
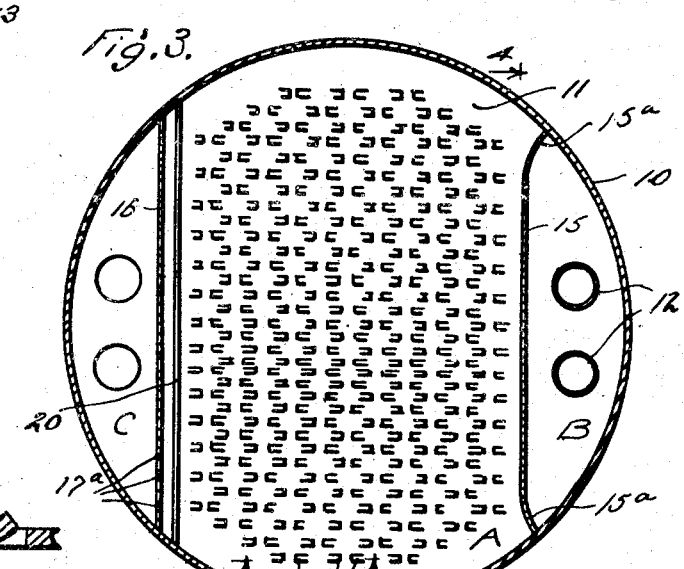
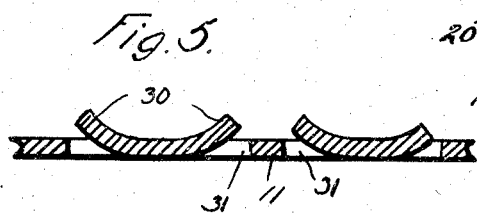
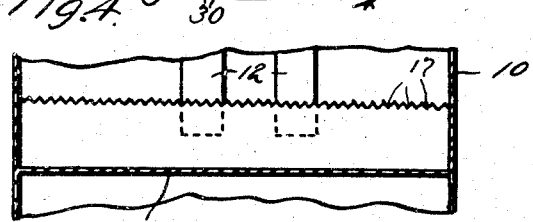
Inventor
John Alexander MacKenzie
by his Attorney Patented Nov. 25, 1930

1,782,735

UNITED STATES PATENT OFFICE

JOHN ALEXANDER MacKENZIE, OF LOS ANGELES, CALIFORNIA

FLUID-TREATING APPARATUS

Application filed March 21, 1927. Serial No. 177,028.

This invention relates to fluid treating apparatus and relates particularly to improvements suitable for use in dephlegmators, bubble towers, etc.

It is a general object of this invention to provide improvements in devices of the character mentioned whereby fluids, such as liquids and vapors or gases, are handled in an efficient, practical and economical manner.

Fluid handling devices, used in some cases in the separation or distillation of fluids and, in other cases, in the mixing or combining of fluids, are known by various names, such as dephlegmators, fractionating columns, absorption towers, bubble towers, mixing towers, etc. The general principles of construction and the general action or mode of operation followed in devices of this character are similar, the variations which occur being principally to accommodate the particular action desired or the characteristics of the fluids being handled. I will refer to my invention as applied to or embodied in a bubble tower, it being understood that when I use the term "bubble tower", I mean to include devices known as absorption towers, dephlegmators, mixing towers, fractionating columns, etc. Further, it is to be understood that my invention may be carried out in apparatus for handling various fluids; for instance, it may be used in apparatus for handling hydrocarbons, spirits, and various other fluids, the refinement or treatment of which involves fractional distillation or the bringing together of liquids and vapors or gases.

It is a primary object of my present invention to provide a simple practical construction operable to obtain an effective contacting of fluids in a bubble tower, or the like.

Another object of my invention is to provide an improved construction for bubble towers whereby a uniform flow of fluids is obtained.

A further object of my invention is to provide a bubble tower, or the like, in which froth or foam is prevented from passing between the several stages or trays.

The various objects and features of my invention will be best and more fully understood from the following detailed description of a typical form and application of the invention, throughout which description reference is had to the accompanying drawings, in which:

Fig. 1 is a view showing a typical bubble tower with certain parts shown in section to illustrate the general application of my invention;

Fig. 2 is an enlarged, detailed, sectional view of a portion of the tower, showing the construction provided by my invention;

Fig. 3 is a transverse, sectional view of the tower, being a view taken as indicated by line 3—3 on Fig. 2;

Fig. 4 is a detailed, sectional view, taken as indicated by line 4—4 on Fig. 3; and Fig. 5 is an enlarged, detailed, sectional view, taken substantially as indicated by line 5—5 on Fig. 3.

I have, for purpose of example, shown my invention embodied in a more or less standard type of bubble tower which includes, generally, a vertically disposed cylindrical body 10, a plurality of horizontal division plates or trays 11 mounted in spaced relation in the body, and down-flow pipes 12 for conducting liquid between the trays.

I have shown a plain cylindrical body 10 closed at its ends and provided with only the common or principal connections, such as a gas or vapor connection 13 at the lower end, a gas or vapor outlet 14 at the upper end, a liquid inlet 9 at the upper end, and a liquid outlet 9ª at the lower end. It is to be understood that my invention is not concerned with controls or regulating means such as may be used in connection with bubble towers, or the like, nor is it concerned with special fittings or devices that may be used in or in combination with devices of this general character to facilitate carrying out special processes or particular treatments of fluids. I have, therefore, omitted from my disclosure fittings and apparatus such as are commonly found in bubble towers, and the like, it being understood, however, that such fittings and apparatus may be employed in or in combination with the features of my invention the same as they can be used in or applied to ordinary bubble towers, and the like.

The division plates or trays 11 are mounted horizontally in the body 10 and are spaced apart in the manner usual to trays of bubble towers, and the like. In the case of a cylindrical tower, such as I have shown in the drawings, the trays are in the form of circular plates, as illustrated in Fig. 3 of the drawings.

Each tray 11 is provided on its upper side with two upwardly extending walls or partitions 15 and 16 which form three chambers or compartments at the upper side of the tray. The partitions are preferably arranged substantially parallel with each other and are diametrically opposite each other on the tray so that they form a central circulating chamber A, a receiving chamber B at one side of the chamber A, and a discharge chamber C at the opposite side of the chamber A.

The partition 15 extends between two points on the body 10, or in other words, extends between the extremities of an arc of the body 10, as shown in Fig. 3 of the drawings. The partition 15 may be straight or arranged to coincide with the chord of the said arc of the body, or it may be curved; for instance, it may have its end portions 15a curved so that they have convex sides facing the chamber A and concave sides facing the chamber B. The curved ends of the partition direct liquid overflowing the end portions of the partition in the direction of the wall of the body. The partition 15 extends a suitable distance above the tray and has a horizontal upper edge which forms an overflow edge or weir. In practice, I prefer to provide the upper or overflow edge of the partition 15 with a plurality of notches 17 so that fluid overflows through the notches rather than over a straight edge. It is to be understood, of course, that the notches are preferably uniform in size and depth so that fluid will overflow uniformly throughout the length of the partition. The partition 15 is somewhat higher than the partition 16, thus making the receiving chamber B, formed between the partition 15 and wall of the body 10, deeper than the circulating chamber A, which extends between the two partitions. With this arrangement, liquid supplied to the receiving chamber fills the chamber and then overflows over the upper edge of the partition 15 into the circulating chamber A.

The partition 16 extends between spaced points on the wall of the body 10 in the same general manner as the partition 15, and is arranged diametrically opposite the partition 15 in the manner clearly shown throughout the drawings. The partitions 15 and 16, together with those parts of the wall of the body 10 which extend between the ends of the partitions, from the circulating chamber A to receive and hold liquid overflowing from the receiving chamber B. The partition 16 is not as high as the partition 15 and, therefore, the circulating chamber A is not as deep as the receiving chamber B. The upper edge of the partition 16 may be provided with notches 17a similar to the notches 17 in the partition 15. Fluid overflowing from the receiving chamber B into the chamber A, after filling the chamber A to the top or level of the partition 16, overflows from the chamber A to the discharge chamber C. A vertically disposed baffle-plate 20 is arranged in the chamber A at a point spaced immediately in front of the partition 16.

The baffle-plate is spaced from the tray and extends a substantial distance above the partition 16 in the manner shown in the drawings. The baffle-plate operates to prevent froth or foam on the surface of the liquid in the chamber A from overflowing over the partition 16 into the discharge chamber. The space between the baffle-plate and the tray allows liquid to pass under the baffle-plate to establish an equal level on each side of the baffle-plate and, therefore, the baffle-plate does not interfere with the desired operation of the apparatus.

In accordance with my invention, one or more down-flow pipes 12 connect into the tray to be in communication with the discharge chamber C.

In accordance with the arrangement provided by my invention, successive or adjoining trays are oppositely disposed in the body 10 so that the down-flow pipes in connection with one tray discharge into the receiving chamber B of the next lower tray. It is preferred that the down-flow pipes extend downwardly into the receiving chambers B so that the lower ends of the pipes are submerged or sealed off by the liquid carried in the chambers B.

With the construction above described, liquid introduced into the upper end of the tower will circulate downwardly through the tower passing between the several trays and circulating across the chambers A of the several trays. The vapors or gases to be handled by the apparatus are adapted to circulate upwardly through the bodies of liquid carried in the circulating chambers A and, therefore, openings are provided in those portions of the trays which form the bottoms of the circulating chambers A. Various devices and forms of openings have been used in the trays of bubble towers, and the like, and, as far as certain features of my invention are concerned, I may employ any suitable construction for allowing gases or vapors to circulate upwardly through the trays to pass through the liquid carried in the circulating chambers A. In accordance with the preferred form of my invention, I make a plurality of U shaped cuts in the trays and I bend the tongues 30, formed by the said cuts, somewhat upwardly so that the trays are provided with a plurality of openings 31, each opening having a tongue 30 in an inclined position immediately above it so that gases or vapors passing upwardly through the opening are deflected horizontally. In practice, I prefer to arrange the cuts in pairs with the cuts oppositely disposed and so that the tongues face each other and thus direct the gases or vapors passing through the openings horizontally in opposite directions so that they come together or interfere and thus cause agitation and a breaking up of the flow. By this construction, I find that the flow of gas or vapor through the openings in the trays is effectively broken and agitated so that the gases or vapors are effectively distributed in the liquid in the trays, thus causing particularly effective operation of the apparatus. It will be obvious that the openings just described may be formed of any suitable size and in any suitable number.

In operation, liquid to be handled by the tower may be introduced at the upper end of the tower so that it passes downwardly through the tower from tray to tray and circulates across the circulating chambers A of the trays. The partitions 15 of the trays, being comparatively long, cause effective distribution of the liquid across the chambers A, and the partitions 16, being comparatively long, allow the liquid to discharge from the chambers A in a manner so that there is no tendency for the liquid to circulate through any particular channels in the chambers A and thus pass through the chambers A without uniform circulation. At the same time that liquid is circulated between the trays, gases or vapors, introduced in the bottom of the tower or generated within the tower, are maintained at sufficient pressure to circulate up through the openings in the trays so that they come in intimate contact with the liquid circulating through the tower. As above mentioned, the tongues on the upper sides of the trays at the openings in the trays deflect or direct the gases or vapors in a manner to effectively distribute them in the liquid in the trays, thus causing intimate contacting of the vapors or gases with the liquid.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A tower of the character described including a vertically disposed body, horizontally disposed trays in the body, two spaced upwardly extending weirs on each tray each extending completely across the tray, the partitions forming a central circulating chamber, a receiving chamber and a discharge chamber at each tray, a down flow pipe connected with each tray in communication with the discharge chamber, the trays being related so that the down flow pipes connect the discharge chambers and receiving chambers of adjacent trays, and means for circulating gas upward through the trays including a plurality of upwardly inclined tongues extending over openings in the trays, the tongues and openings being arranged in pairs with the tongues facing each other.

2. A tower of the character described including a vertically disposed body, horizontally disposed trays in the body, two spaced parallel diametrically opposite upwardly extending solid partitions on each tray, each extending completely across the tray, the partitions forming a central circulating chamber, a receiving chamber and a discharge chamber at each tray, a down flow pipe connected with each tray in communication with the discharge chamber, the trays being related so that the down flow pipes connect the discharge chambers and receiving chambers of adjacent trays.

3. A tower of the character described having a tray formed with a plurality of openings and upwardly inclined tongues over the openings, the holes and tongues throughout the tray being arranged in pairs with the tongues facing each other.

In witness that I claim the foregoing I have hereunto subscribed my name this 21st day of February, 1927.

JOHN A. MacKENZIE.